Oct. 25, 1938.  E. R. SCHOFIELD  2,134,208

VALVE

Filed Oct. 3, 1935  2 Sheets-Sheet 1

INVENTOR.
Edwin R. Schofield
BY
Walter C. Ross
ATTORNEY.

Oct. 25, 1938.  E. R. SCHOFIELD  2,134,208
VALVE
Filed Oct. 3, 1935  2 Sheets-Sheet 2
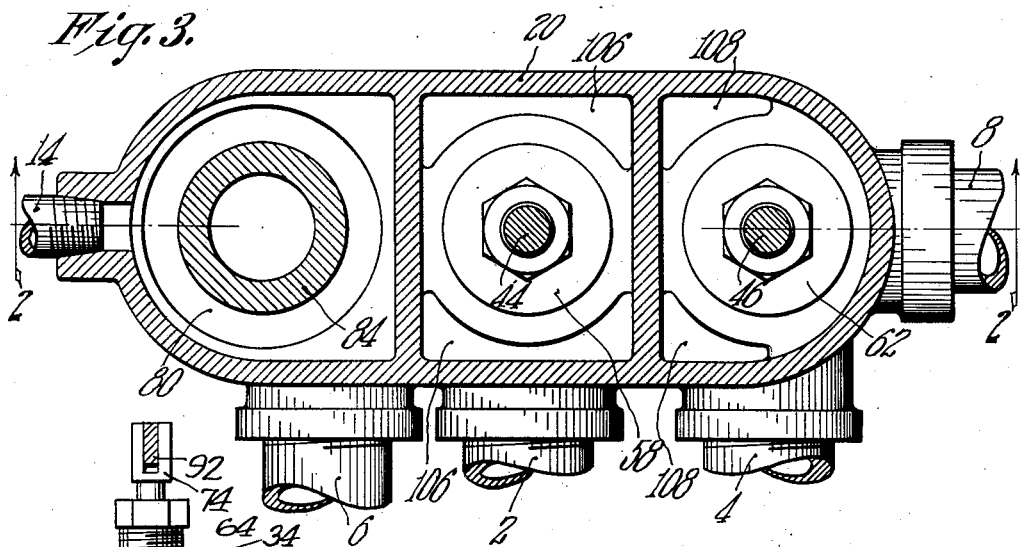
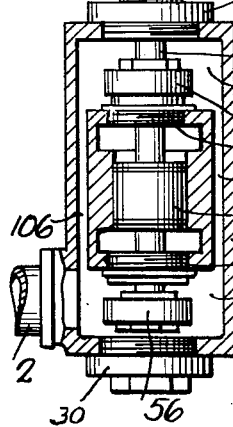
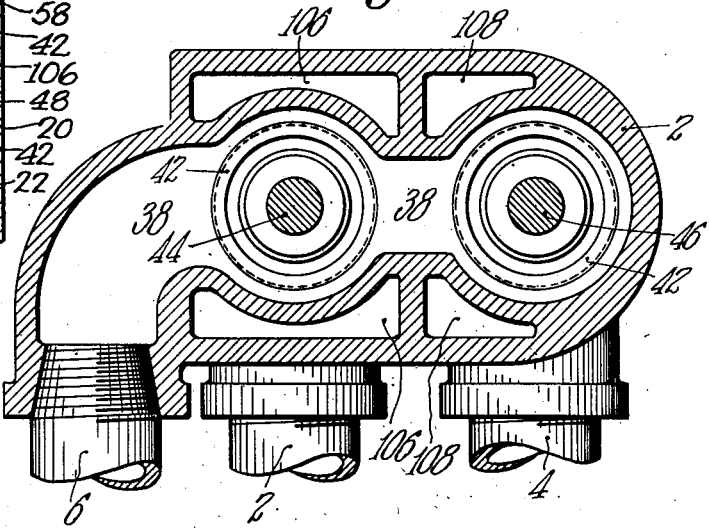
INVENTOR.
Edwin R. Schofield
BY
Walter C. Ross
ATTORNEY.

Patented Oct. 25, 1938

2,134,208

UNITED STATES PATENT OFFICE 2,134,208

VALVE

Edwin R. Schofield, Philadelphia, Pa.

Application October 3, 1935, Serial No. 43,436

5 Claims. (Cl. 121—46.5)

This invention relates to improvements in valve apparatus and is directed more particularly to a valve which may be called a reversing valve that is adapted to control the flow of fluid alternately in one direction and then in the other.

The principal objects of the invention are directed to the provision of a valve which may be called a reversing valve that is constructed and arranged in a novel manner so that fluid may pass therethrough and out either one of two discharge ports, the said valve being adapted to be controlled in its operation by suitable differential pressure means.

The valve of the invention is characterized by its simplicity in form so as to be economical to manufacture and yet by reason of its novel construction and arrangement it may be used with efficiency for many and various purposes.

According to one feature of the invention the valve has alternately shiftable pairs of valve members and connections with an operating member so constructed and arranged that when a valve of one pair is in engagement with its seat, it functions as a fulcrum to facilitate movements of the valves of the other pair.

According to another feature of the invention the construction is such that pressures are balanced. This insures efficiency in operation and obviates excessive strains thereby facilitating relatively light weight construction and resulting low costs.

Various novel features and advantages of the invention will be hereinafter more fully referred to in connection with the accompanying description of the preferred form of the invention, reference being had to the accompanying drawings wherein:

Fig. 3 is a sectional plan view on the line 3—3 of Fig. 2;

Fig. 4 is a sectional plan view on the line 4—4 of Fig. 2; and

Fig. 5 is a small scale sectional elevational view taken through the valve shown in Fig. 2 approximately on the center line of the valves 56 and 58.

Figure 2:
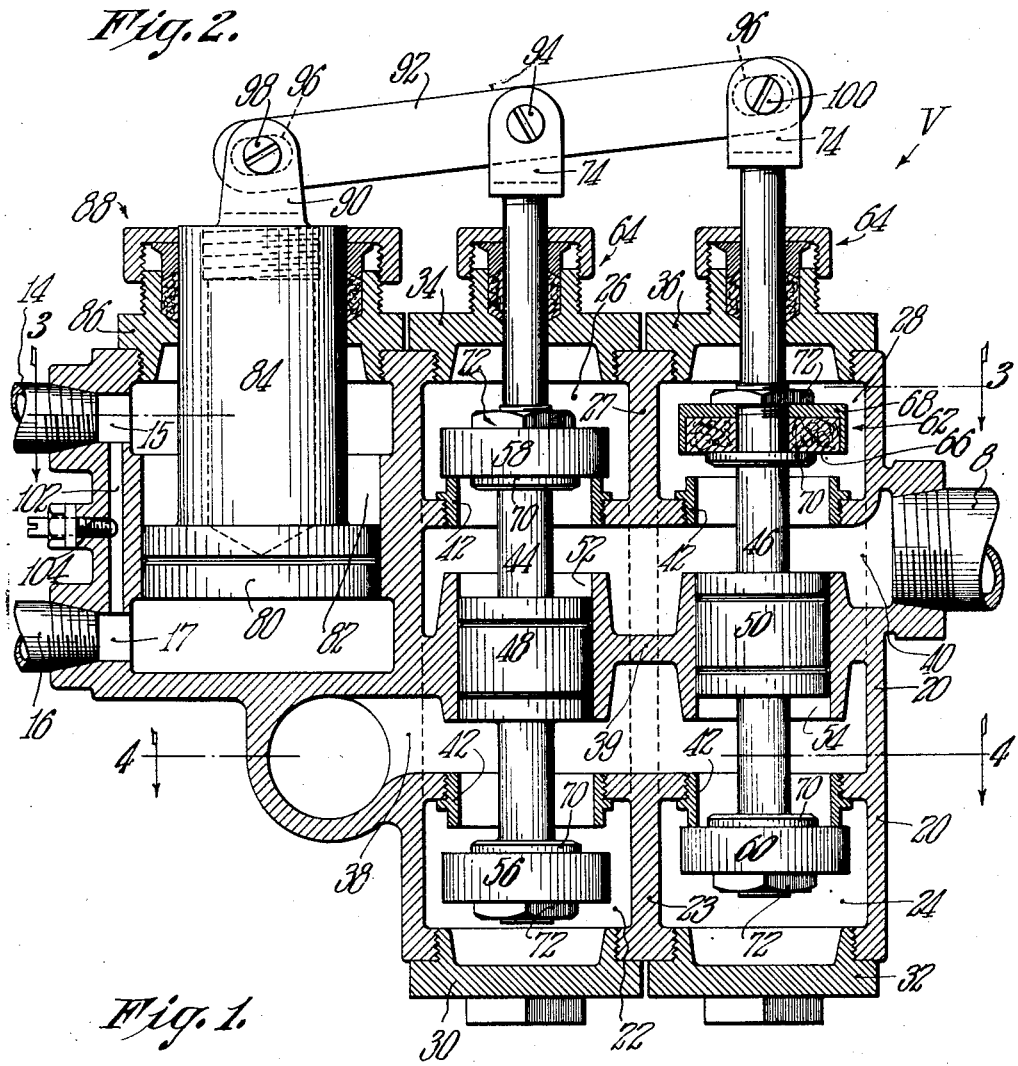
Fig. 2 is a sectional elevational view through the valve of the invention to show certain novel features of construction.

Referring now to the drawings more in detail the invention will be fully described.

Figure 1:
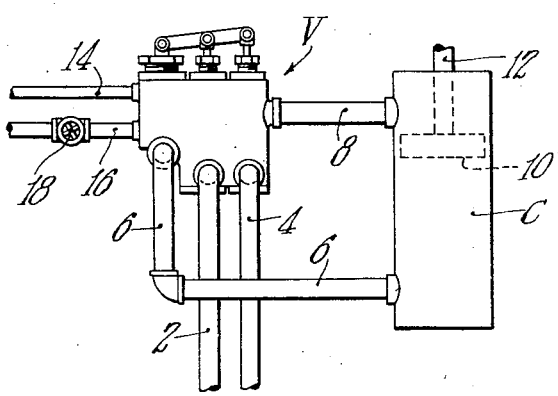
Fig. 1 is a small scale diagrammatic elevational view to explain how the valve of the invention may be used.

In the small scale diagrammatic view of Fig. 1 the valve of the invention is represented by V. A supply pipe connected to an inlet of the valve and which may be suitably connected to a supply of fluid under pressure is represented by 2 and a discharge pipe connected to a discharge port of the valve is represented at 4.

Outlet pipes connected to outlets of the valve are represented at 6 and 8. The valve V is adapted and arranged so that either one of the pipes 6 or 8 may be in communication with the supply pipe 2 and when one of said pipes is in communication with the supply pipe the other pipe is in communication with the discharge pipe 4.

The valve may be connected to various forms of apparatus but in Fig. 1 a cylinder is represented diagrammatically at C which has a piston 10 reciprocable therein for up and down movements. A rod such as 12 for operating various types of apparatus may be attached to the piston. For instance, the rod 12 may be connected to the gate of a valve or the like which it is desired to move in opposite directions to open and close the valve.

The valve V is preferably operated by a differential in pressure according to this invention and for this purpose a pipe 14 is connected to a port of the valve as is a relief pipe 16 therebelow. A valve 18 is shown in the pipe 16 which may be opened and closed to bring about a pressure differential for operating the valve so that accordingly as the relief pipe 16 is opened or closed, the valve V will operate to permit fluid to be delivered from pipe 2 to either of the pipes 6 or 8. The valve 18 may take various forms and of course it may be a float operated snap valve of the like. Likewise, the cylinder C may take various forms; the parts being shown merely to indicate one way in which the valve of the invention may be used.

The valve V consists of a body 20 having lower chambers 22 and 24 and upper chambers 26 and 28. The chambers 22 and 24 are closed by caps 30 and 32 while the chambers 26 and 28 are closed by caps 34 and 36. The chambers 22 and 26 and the chambers 24 and 28 may constitute pairs of chambers.

The lower chambers 22 and 24 are not interconnected but are separated by a partition 23. The upper chambers 26 and 28 are likewise separated by a partition 27. The supply pipe 2 leads into an inlet in communication with the lower chamber 22 while the discharge pipe leads into a discharge port and in communication with the lower chamber 24.

An intermediate chamber 38 separate from chambers 22 and 24 is provided in the lower part of the body and the pipe 6 is in communication therewith. Another intermediate chamber 40 is separated from the passageway 38 by a partition 39 and has an outlet for the pipe 8.

Valve seat members 42 having openings therethrough are associated with the chambers 22, 24, 26 and 28. The valve seat members provide passageways between the chambers as shown. Valve spindles or stems 44 and 46 are provided and have pistons 48 and 50 reciprocable in bores 52 and 54. These stems carry valves 56, 58, 60 and 62 which are arranged to abut and coact with the valve seat members. The valves 56 and 58 and the valves 60 and 62 constitute pairs of valves.

Stuffing boxes indicated generally by 64 are associated with the caps 34 and 36 and slidably receive the valve rods 44 and 46. The pistons 48 and 50 within their respective bores and the stuffing boxes 64 co-operate to guide the valve rods 44 and 46 for up and down reciprocating movements.

The valves 56, 58, 60 and 62 may be of usual construction arranged to seat on the valve seat members 42 but if desired each may consist of a disc such as 66 and a cup 68 clamped between flanges 70 on the valve rods and nuts 72. The upper ends of the rods 44 and 46 carry forks such as 74 and pivots 94 and 96 as shown. A piston 80 is reciprocable in a bore 82 provided in the body and has an upper cylindrical part 84 which is reciprocable in a cap 86 and a stuffing box associated therewith which is indicated generally by 88.

The piston 80 while shown for operating the valves is not necessary as an electrical device or the like having a reciprocable or otherwise movable part may be substituted, if desired.

A fork part 90 on the upper end of the piston is forked to receive one end of a rocking lever or link 92 which is pivoted on pivot 94 of the fork 74 of rod 44. The other end of the lever 92 is disposed within the fork 74 of rod 46.

The opposite ends of the link are slotted as at 96 and receive the pivot 98 associated with fork 90 of the piston and the pivot 100 associated with fork 74 of rod 46. This link arrangement shown allows relative up and down movements of the piston 80 and valve rods 44 and 46 as will hereinafter appear.

The pressure pipe 14 leads into a port 15 disposed above piston 80 and the relief pipe 16 leads into a port 17 below said piston. A by-pass 102 extends up and down in the body from the ports 15 and 17 and an adjustable valve 104 which may be in the form of a screw as shown is arranged to enter the by-pass passageway more or less so as to control the flow of fluid therethrough.

As has been stated, the lower chambers 22 and 24 are not connected together nor are the upper chambers 26 and 28. Vertical passageways however extend upwardly in the body so that lower chamber 22 is connected to the upper chamber 26 while the lower chamber 24 is connected to the upper chamber 28. These passageways are shown more clearly in Figs. 3 and 4 as 106 and 108.

For the purpose of briefly describing the operation of the valve it will be assumed that the supply pipe 2 is connected to a source of supply such as a water supply and that pipe 14 is connected to a supply such as water, the water being under sufficient pressure for efficient operation.

With the parts in the position shown in Fig. 1, the valve 18 of pipe 10 or any other valve in lieu thereof is open. In this position of the parts the supply pipe 2 is in communication with chamber 38 and pipe 6 through the valve seat past valve 56. The pipe 8 connected to chamber 40 is in communication with passageway 108 which leads into chamber 24 to which the discharge pipe is connected.

To reverse the parts, valve 18 is closed so that pressure is by-passed through by-pass 102 against piston 80 and causes the piston to elevate. As it elevates, lever link 92 is caused to fulcrum on pivot 94 moving valve rod 46 downwardly and moving valve 62 onto its seat and unseating valve 60. Simultaneously when valve 62 is seated lever link is now fulcrumed on pivot 100 so that rod 44 is elevated unseating valve 58 and seating valve 56.

In this position of the valves pipe 6 which is connected to chamber 38 is in communication with discharge pipe 4 because valve 60 is off its seat. Also the supply pipe 2 connected to chamber 22 is now connected to upper chamber 26 which is in communication with chamber 40 and pipe 8 because valve 58 is off its seat.

As before stated, the valve apparatus may be used for controlling the flow of various fluids to various forms of apparatus and the pressure differential for operating the piston may be accomplished by various means.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. A unitary reversing valve apparatus comprising in combination, a body having pairs of separate chambers, separate intermediate chambers and separate passageways, each pair of chambers including upper and lower chambers and the said passageways connecting each of the first-named chambers with an intermediate chamber, valve seats associated with said passageways, pairs of valves co-operating with said valve seats to open and close the passageways, a reciprocable rod associated with each pair of valves, journal means between the valves associated with each rod and said body, operating means for said rods, and connections therebetween and said rods arranged and adapted to reciprocate said rods in opposite directions, the said journal means including pistons carried by the rods reciprocable in bores provided in the body.

2. A unitary reversing valve apparatus comprising in combination, a body provided with separate pairs of chambers each pair including upper and lower chambers, upper and lower intermediate chambers, passageways connecting the upper chamber of each pair to the upper intermediate chamber and passageways connecting the lower chamber of each pair to the lower intermediate chamber, and other separate passageways connecting the upper and lower chamber of each pair of chambers, valve seats associated with each of the first-named passageways, pairs of valves cooperating with the valve seats of the passageways leading to the pairs of upper and lower chambers, a rod secured to each pair of valves, journal means between each pair of valves associated with the rods and body including pistons on the rods reciprocable in bores provided in the body, and operating means connected to said rods.

3. A unitary reversing valve apparatus comprising in combination, a body provided with separate pairs of chambers each pair including upper and lower chambers, upper and lower intermediate chambers, passageways connecting the upper chamber of each pair to the upper intermediate chamber and passageways connecting the lower chamber of each pair to the lower intermediate chamber, and other separate passageways connecting the upper and lower chamber of each pair of chambers, valve seats associated with each of the first-named passageways, pairs of valves cooperating with the valve seats of the passageways leading to the pairs of upper and lower chambers, a rod secured to each pair of valves, journal means between each pair of valves associated with the rods and body including pistons on the rods reciprocable in bores provided in the body, and operating means connected to said rods, the said operating means including a reciprocable member, a link, and pivotal connections between said link, member and rods.

4. A unitary reversing valve apparatus comprising in combination, a body provided with separate pairs of chambers each pair including upper and lower chambers, upper and lower intermediate chambers, passageways connecting the upper chamber of each pair to the upper intermediate chamber and passageways connecting the lower chamber of each pair to the lower intermediate chamber, and other separate passageways connecting the upper and lower chamber of each pair of chambers, valve seats associated with each of the first-named passageways, pairs of valves cooperating with the valve seats of the passageways leading to the pairs of upper and lower chambers, a rod secured to each pair of valves, journal means between each pair of valves associated with the rods and body including pistons on the rods reciprocable in bores provided in the body, and operating means connected to said rods, the said operating means including a piston reciprocable in a bore provided in said body, a link and pivotal connections between said link, pistons and rods.

5. A unitary reversing valve apparatus comprising in combination, a body provided with separate pairs of chambers each pair including upper and lower chambers, upper and lower intermediate chambers, passageways connecting the upper chamber of each pair to the upper intermediate chamber and passageways connecting the lower chamber of each pair to the lower intermediate chamber, and other separate passageways connecting the upper and lower chamber of each pair of chambers, valve seats associated with each of the first-named passageways, pairs of valves cooperating with the valve seats of the passageways leading to the pairs of upper and lower chambers, a rod secured to each pair of valves, journal means between each pair of valves associated with the rods and body including pistons on the rods reciprocable in bores provided in the body, and operating means connected to said rods, the said operating means including a piston, a link and pivotal connections between said link piston and rods and the said body provided with a bore in which said piston is reciprocable, ports leading into said bore and a by-pass passageway between said ports.

EDWIN R. SCHOFIELD.